(12) United States Patent
Shelley et al.

(10) Patent No.: US 7,025,914 B2
(45) Date of Patent: *Apr. 11, 2006

(54) MULTILAYER APPROACH TO PRODUCING HOMOFILAMENT CRIMP SPUNBOND

(75) Inventors: Jeffrey David Shelley, Appleton, WI (US); Kurtis L. Brown, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 627 days.

This patent is subject to a terminal disclaimer.

(21) Appl. No.: 10/010,620

(22) Filed: Dec. 6, 2001

(65) Prior Publication Data

US 2002/0090499 A1 Jul. 11, 2002

Related U.S. Application Data

(60) Provisional application No. 60/257,972, filed on Dec. 22, 2000.

(51) Int. Cl.
*D01D 5/22* (2006.01)
*D01D 10/02* (2006.01)

(52) U.S. Cl. .................. 264/103; 264/168; 264/211.17
(58) Field of Classification Search ................ 442/381, 442/382, 392, 352; 156/166, 167; 428/371; 264/103, 168, 211.17
See application file for complete search history.

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,502,538 A | 3/1970 | Petersen | |
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 4,107,364 A | 8/1978 | Sisson | |
| 4,238,175 A | 12/1980 | Fujii et al. | |
| 4,241,123 A | 12/1980 | Shih | |
| 4,340,563 A | 7/1982 | Appel et al. | |
| 4,359,445 A * | 11/1982 | Kane et al. ................. | 264/518 |
| 4,363,845 A | 12/1982 | Hartmann | |
| 4,668,566 A | 5/1987 | Braun | |

(Continued)

FOREIGN PATENT DOCUMENTS

EP 0 586 924 A1 3/1994

(Continued)

*Primary Examiner*—Elizabeth M. Cole
(74) *Attorney, Agent, or Firm*—Pauley Petersen & Erickson

(57) ABSTRACT

A multilayer laminate is produced with in-line fabric deposition. One layer of the multilayer laminate has stable, heat-set, helically crimped fibers which are uncompacted and therefore retain their loft.

12 Claims, 3 Drawing Sheets

U.S. PATENT DOCUMENTS

| | | |
|---|---|---|
| 4,737,404 A | 4/1988 | Jackson |
| 4,753,834 A | 6/1988 | Braun et al. |
| 4,778,460 A | 10/1988 | Braun et al. |
| 4,795,559 A | 1/1989 | Shinjou et al. |
| 4,872,870 A | 10/1989 | Jackson |
| 4,883,707 A | 11/1989 | Newkirk |
| 5,660,910 A | 8/1997 | Hoyt et al. |
| 5,707,468 A | 1/1998 | Arnold et al. |
| 5,766,737 A | 6/1998 | Willey et al. |
| 5,810,954 A | 9/1998 | Jacobs et al. |
| 5,817,403 A | 10/1998 | Gillyns et al. |
| 6,019,152 A | 2/2000 | Haynes et al. |
| 6,066,221 A | 5/2000 | Marmon et al. |
| 6,123,886 A | 9/2000 | Slack |

FOREIGN PATENT DOCUMENTS

| | | |
|---|---|---|
| WO | WO 00/66057 | 11/2000 |
| WO | WO 02/18693 A2 | 3/2002 |

\* cited by examiner

MULTILAYER APPROACH TO PRODUCING HOMOFILAMENT CRIMP SPUNBOND

This application claims the benefit of Provisional Application No. 60/257,972, filed Dec. 22, 2000.

FIELD OF THE INVENTION

The present invention relates generally to lofty nonwoven fiber webs. The present invention relates specifically to lofty nonwoven fiber webs of homofilament crimped fibers and means for utilizing the web in its lofty and uncompressed state to retain the advantages of web structure.

BACKGROUND OF THE INVENTION

Webs of homofilament crimped thermoplastic fibers are useful for various fluid handling or retaining materials and the like because of their open structure, resiliency, and economy of manufacture. Particularly, the use of a single thermoplastic polymer in the making of the crimped fibers is good for economical and consistent manufacture. However, one may lose the benefit of the lofty crimped fiber web structure if the homofilament crimped web is processed by known means. Because a homofilament crimped web is usually loosely bonded, such means will include compaction of the web or exposure to high heat, in order to increase the integrity of the web for later processing. Compaction, as in Jacobs et al., U.S. Pat. No. 5,810,954, will decrease bulk or loft of the web through mechanical action as the web is drawn between compaction rollers. Also, this type of processing may result in mechanical failure of the rollers as the filaments become entangled in the mechanical works of the rollers.

In another known means of increasing web integrity, exposure to high heat in an effort to provide thermal bonding between filaments of the web, as in the hot air knife (HAK) teaching of U.S. Pat. No. 5,707,468 to Arnold et al., will result in relaxation of the fiber crimp with resultant loss of bulk for the web.

Conversely, it has been found that the crimps of a homofilament crimped thermoplastic fiber web may be crystallized, or set, to retain their loft through low applications of heat as in U.S. Pat. No. 6,123,886 to Slack. However this treatment does little to increase the integrity of the web for modem, high-speed, line-transfer manufacturing, and as taught in Slack, is a slow, off-line process unsuitable for economical manufacture rates.

Therefore, there is a need in the art for methods and materials utilizing the lofty crimped homofilament nonwoven web with high loft intact and with sufficient integrity to the lofty crimped web to enable high speed manufacturing processes to achieve economy.

DEFINITIONS

Within the context of this specification, each term or phrase below will include the following meaning or meanings.

"Article" refers to a garment or other end-use article of manufacture, including but not limited to, diapers, training pants, swim wear, catamenial products, medical garments or wraps, and the like.

"Bonded" or "bonding" refers to the joining, adhering, connecting, attaching, or the like, of two elements. Two elements will be considered to be bonded together when they are bonded directly to one another or indirectly to one another, such as when each is directly bonded to intermediate elements.

"Connected" refers to the joining, adhering, bonding, attaching, or the like, of two elements. Two elements will be considered to be connected together when they are connected directly to one another or indirectly to one another, such as when each is directly connected to intermediate elements.

"Cross direction assembly" refers to a process in which disposable absorbent products are manufactured in an orientation in which the products are connected side-to-side, in the transverse direction shown by arrow 49 in FIG. 3, a process utilizing a cross direction assembly entails products traveling through a converting machine parallel to the direction of arrow 49, as opposed to "machine direction assembly" in which the products are connected end-to-end or waist-to-waist.

"Disposable" refers to articles which are designed to be discarded after a limited use rather than being laundered or otherwise restored for reuse.

"Disposed," "disposed on," and variations thereof are intended to mean that one element can be integral with another element, or that one element can be a separate structure bonded to or placed with or placed near another element.

"Fabrics" is used to refer to all of the woven, knitted and nonwoven fibrous webs.

"Film" refers to a thermoplastic film made using a film extrusion and/or foaming process, such as a cast film or blown film extrusion process. The term includes apertured films, slit films, and other porous films which constitute liquid transfer films, as well as films which do not transfer liquid.

"Flexible" refers to materials which are compliant and which will readily conform to the general shape and contours of the wearer's body.

"Homofilament" refers to a fiber formed from only one predominate polymer and made from a single stream of that polymer. This is not meant to exclude fibers formed from one polymer to which small amounts of additives have been added for coloration, anti-static properties, lubrication, hydrophilicity, etc.

"Integral" or "integrally" is used to refer to various portions of a single unitary element rather than separate structures bonded to or placed with or placed near one another.

"Layer" when used in the singular can have the dual meaning of a single element or a plurality of elements.

"Liquid impermeable," when used in describing a layer or multi-layer laminate, means that a liquid, such as urine, will not pass through the layer or laminate, under ordinary use conditions, in a direction generally perpendicular to the plane of the layer or laminate at the point of liquid contact. Liquid, or urine, may spread or be transported parallel to the plane of the liquid impermeable layer or laminate, but this is not considered to be within the meaning of "liquid impermeable" when used herein.

"Liquid permeable material" or "liquid water-permeable material" refers to a material present in one or more layers, such as a film, nonwoven fabric, or open-celled foam, which is porous, and which is water permeable due to the flow of water and other aqueous liquids through the pores. The pores in the film or foam, or spaces between fibers or filaments in a nonwoven web, are large enough and frequent enough to permit leakage and flow of liquid water through the material.

"Longitudinal" and "transverse" have their customary meaning, as indicated by the longitudinal and transverse axes depicted in FIG. 3. The longitudinal, or long, axis lies in the plane of the article and is generally parallel to a vertical plane that bisects a standing wearer into left and right body halves, when the article is worn. The transverse axis lies in the plane of the article generally perpendicular to the longitudinal axis. The article, although illustrated as longer in the longitudinal direction than in the transverse direction, need not be so.

"Machine direction" refers to the length of a fabric in the direction in which it is produced, as opposed to "cross direction" which refers to the width of a fabric in a direction generally perpendicular to the machine direction.

"Machine direction assembly" refers to a process in which disposable absorbent products are manufactured in an orientation in which the products are connected end-to-end or waist-to-waist, in the longitudinal direction shown by arrow 48 in FIG. 3, a process utilizing a machine direction assembly entails products traveling through a converting machine parallel to the direction of arrow 48, as opposed to "cross direction assembly" in which the products are connected side-to-side.

"Meltblown fiber" means fibers formed by extruding a molten thermoplastic material through a plurality of fine, usually circular, die capillaries as molten threads or filaments into converging high velocity heated gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than about 0.6 denier, and are generally self bonding when deposited onto a collecting surface. Meltblown fibers used in the present invention are preferably substantially continuous in length.

"Meltspun" refers generically to a fiber which is formed from a molten polymer by a fiber-forming extrusion process, for example, such as are made by the meltblown and spunbond processes.

"Member" when used in the singular can have the dual meaning of a single element or a plurality of elements.

"Nonwoven" and "nonwoven web" refer to materials and webs of material which are formed without the aid of a textile weaving or knitting process.

"Permanently bonded" refers to the joining, adhering, connecting, attaching, or the like, of two elements of an absorbent garment such that the elements tend to be and remain bonded during normal use conditions of the absorbent garment.

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

Words of degree, such as "About", "Substantially", and the like are used herein in the sense of "at, or nearly at, when given the manufacturing and material tolerances inherent in the stated circumstances" and are used to prevent the unscrupulous infringer from unfairly taking advantage of the invention disclosure where exact or absolute figures are stated as an aid to understanding the invention.

"Spunbond fiber" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Petersen, and U.S. Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average deniers larger than about 0.3, more particularly, between about 0.6 and 10.

"Stretchable" means that a material can be stretched, without breaking, to at least 150% of its initial (unstretched) length in at least one direction, suitably to at least 200% of its initial length, desirably to at least 250% of its initial length.

"Surface" includes any layer, film, woven, nonwoven, laminate, composite, or the like, whether pervious or impervious to air, gas, and/or liquids.

"Thermoplastic" describes a material that softens when exposed to heat and which substantially returns to a non-softened condition when cooled to room temperature.

As used herein the term "compaction roll" means a set of rollers above and below the web to compact the web as a way of treating a just produced spunbond web in order to give it sufficient integrity for further processing, but not the relatively strong bonding of secondary bonding processes like through-air bonding, thermal point bonding and ultrasonic bonding. Compaction rolls slightly squeeze the web in order to increase its self-adherence and thereby its integrity. Compaction rolls may be operated at heated, chilled, or ambient temperatures.

As used herein the term "hot air knife" or "HAK" means a process of pre- or primarily bonding a just produced spunbond web in order to give it sufficient integrity for further processing similar to the function served by compaction rolls, but does not mean the relatively strong bonding of secondary bonding processes like through air bonding, thermal bonding and ultrasonic bonding. A hot air knife is a device which focuses a stream of heated air at a very high flow rate, generally about 1,000 to about 10,000 feet per minute (fpm) (305 to 3050 meters per minute), or more particularly, from about 3,000 to 5,000 feet per minute (915 to 1525 meters per minute) directed at the nonwoven web immediately after its formation. The air temperature is usually in the range of the melting point of at least one of the polymers used in the web, generally between about 200° and 550° F. (93° and 290° C.) for the thermoplastic polymers commonly used in spunbonding. The control of air temperature, velocity, pressure, volume and other factors helps avoid damage to the web while increasing its integrity. The HAK's focused stream of air is arranged and directed by at least one slot of about ⅛ to 1 inches (3 to 25 mm) in width, particularly about ⅜ inch (9.4 mm), serving as the exit for the heated air towards the web, with the slot running in a substantially cross-machine direction over substantially the entire width of the web. In other embodiments, there may be a plurality of slots arranged next to each or separated by a slight gap. The at least one slot is usually, though not essentially, continuous, and may be comprised of, for example, closely spaced holes. The HAK has a plenum to distribute and contain the heated air prior to its exiting the slot. The plenum pressure of the HAK is usually between about 1.0 and 12.0 inches of water (2 to 22 mmHg), and the HAK is positioned between about 0.25 and 10 inches and more preferably 0.75 to 3.0 inches (19 to 76 mm) above the forming wire. In a particular embodiment the HAK plenum's cross sectional area for cross-directional flow (i.e., the plenum cross sectional area in the machine direction) is at least twice the total slot exit area. Since the foraminous wire onto which spunbond polymer is formed generally moves at a high rate of speed, the time of exposure of any particular part of the web to the air discharged from the hot air knife is less than a tenth of a second and generally about a hundredth of a second in contrast with the through air bonding process which has a much larger dwell time. The HAK process has a great range of variability and controllability of many factors such as air temperature, velocity, pressure, volume, slot or hole arrangement and size, and the distance from the HAK plenum to the web. More detailed information on the hot air knife process may be found in U.S. Pat. No. 5,707,468 issued Jan. 13, 1998, to Arnold et al.

These terms may be defined with additional language in the remaining portions of the specification.

SUMMARY OF THE INVENTION

A web of homofilament crimped fibers is subjected to a diffused hot air knife (HAK) processing which provides heat for setting the crimps in the filaments without excessive interfiber bonding or relaxing of the crimp. The set-crimp web is attached or laminated to a more rugged material layer for providing the web integrity necessary for high speed web transfer technology. The laminate is desirably produced and treated in an in-line process which enables economies of manufacture.

Specifically, a first layer of nonwoven filaments is deposited onto a forming belt, or foraminous wire, as shown in the art. This first layer is treated, such as by known hot air knife treatment, to bond the first layer into a web with sufficient integrity to withstand high speed web transfer handling. An intermediate nonwoven layer may then, if desired, be deposited onto the first layer to provide desired properties for the ultimately resulting laminate. The intermediate layer may or may not be heat treated depending on fiber type, desired laminate functionality, or morphology, or the like. A layer of lofty nonwoven filaments such as e.g., helically crimped homofilaments, are then, connected to, or deposited over, the first layer and any in-place intermediate layers, and treated in-line on the forming belt with sufficient heat to set the crimps without substantial melt bonding or crimp relaxation of the crimped fibers in order to retain the lofty structure of this layer of the laminate. The various web layers, i.e., the first layer for mechanical integrity, the second lofty, helical crimped, layer, and any intervening or additional layers are then bonded, such as by thermal point bonding, to retain the essential characteristics of each layer and bond the layers together with sufficient integrity to create a laminate that will withstand high speed web transfer processing without harm to the processing equipment or the material. It will be understood that manufacturing speeds will be dependent on the materials being formed, but the present invention should have few practical limits in this regard and may accommodate web speeds by way of example only, in the range of 200 to 2000 feet per minute.

The crimped fiber laminate material made according to the present invention can be useful for high loft and high bulk applications such as the loop portions of hook and loop fasteners when designed for engageability with the hook portions, or if a natural fabric cloth-like feel is desired, the fibers may be designed to produce fabric of good softness and drape while keeping sufficient bulk and loft to aid in the cloth like feel. The crimped fiber laminate material of the present invention may further be useful for making fabrics which are extensible largely in the cross direction of the resultant nonwoven web.

DETAILED DESCRIPTION OF THE PRESENTLY PREFERRED EMBODIMENTS

The present invention provides a method of producing a nonwoven fabric laminate having sufficient strength to utilize an uncompressed homofilament helical crimped nonwoven web. The present invention is usable with meltblown or spunbond or a combination of the two or using other web forming processes known to those skilled in the art. In general, the method comprises in-line production of a mechanical strength layer such as a heat treated spunbond web layer or film layer, and the application of the crimped filament web over the top of, or connected to, the mechanical strength layer. The crimped layer retains its loft because the fibers are not crushed or subject to excessive heat during processing of the laminate. For purposes of the present description a laminate of spunbond-meltblown-spunbond fibers shall be discussed. It is to be understood that other laminates and non-laminate fiber mat structures can be employed.

In a preferred embodiment of the present invention, the fibers may be formed of resin which is preferably a thermoplastic polymer such as, but not limited to, polyolefins, polyesters, polyamides, polyurethanes, copolymers and mixtures thereof.

Figure 1:
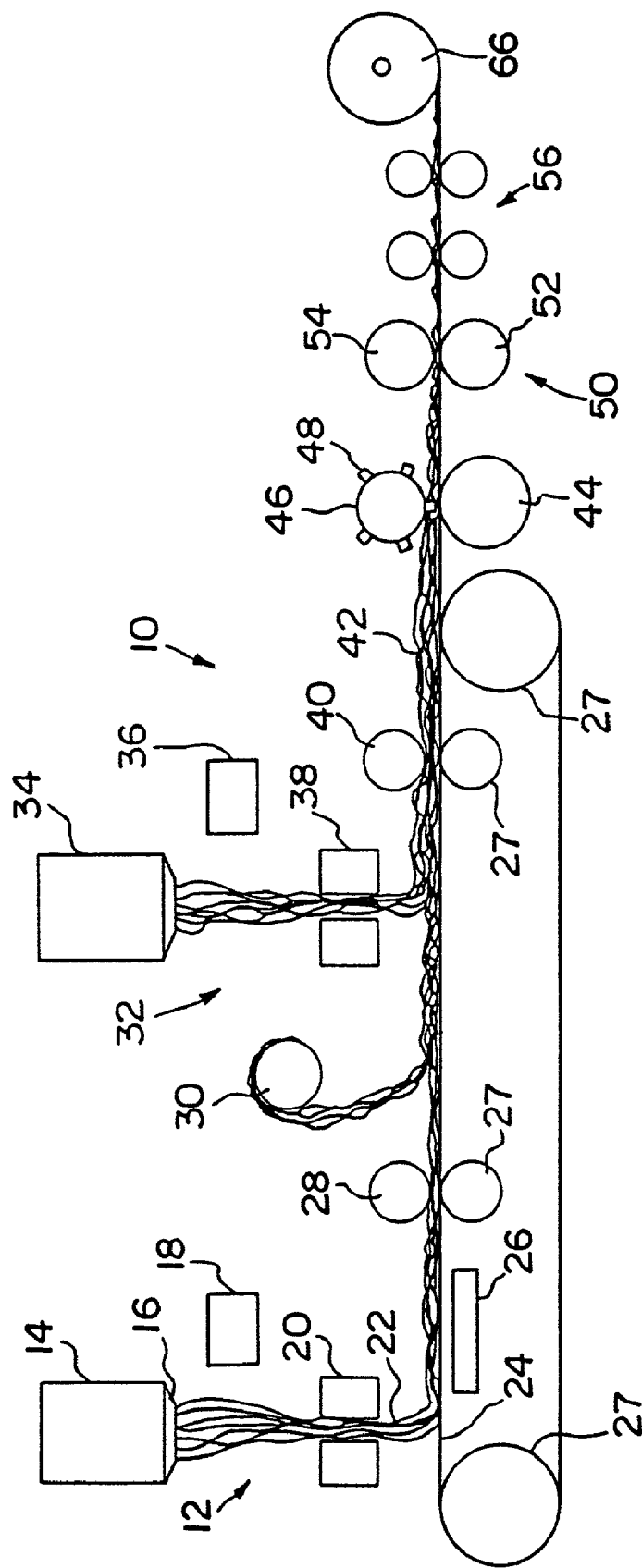
FIG. 1 is an example of known techniques for laminating crimped fiber webs in which the fibers are compacted.

FIG. 1 illustrates a known apparatus 10 for manufacturing a spunbond/meltblown/spunbond (SMS) material for purposes of explaining the general technical environment of the present invention. Apparatus 10 has a first fiber making assembly 12 for producing spunbond fibers in accordance with known methods. A spinneret 14 is supplied with molten polymer resin from a resin source (not shown). The spinneret 14 produces fine denier fibers from the exit 16, which are quenched by an air stream supplied by a quench blower 18. The air stream may differentially cool one side of the fiber stream more than the other side, thus causing bending and crimping of the fibers. Crimping, as discussed in general herein, creates a softer fabric by reducing the "straightness" of the fibers, between bond points created in the thermal bonding step, as well as fiber-to-fiber bonds. Various parameters of the quench blower 18 can be controlled to control the quality and quantity of crimping. Fiber composition and resin selection also determine the crimping characteristics imparted. In some embodiments, conjugate fibers can be produced which have different crimping properties.

The filaments are drawn into a fiber drawing unit or aspirator 20 having a Venturi tube/channel 22, through which the fibers pass. The tube is supplied with controlled air, which attenuates the filaments as they are pulled through the fiber drawing unit 20. The attenuated fibers are then deposited onto a foraminous moving collection belt 24 and retained on the belt 24 by a vacuum force exerted by a vacuum box 26. The belt 24 travels around guide rollers 27. As the fibers move along on the belt 24, a compaction roll 28 above the belt, which operates with one of the guide rollers 27 beneath the belt, compresses the spunbond mat so that the fibers have sufficient integrity to go through the manufacturing process.

Alternatively, as known, instead of a compaction roll 28, a hot air knife can be used to fuse the fibers. An advantage of using a hot air knife is that it reduces or eliminates the problem known in the art as "roll wrap," i.e., a following of the circumference of the compaction roll by all or part of the spunbond web, which can break the web if it wraps completely around the compaction roll. Also a hot air knife avoids the stress that a compaction roll puts on the fibers. The hot air knife melts the surface of the fiber mat and compresses the mat. A hot air knife will generally produce a superior result with a greater throughput speed than a compaction roll.

A layer of meltblown fibers, comprised of <1 µm to about 10 µm diameter, preferably less than 5 µm diameter, may be introduced on top of the spunbond layer from a windup roll 30 of previously manufactured meltblown fibers. Alternatively, it is also possible to form meltblown fibers and deposit them as formed directly on the spunbond layer. The meltblown fibers are formed of resin which is preferably a thermoplastic polymer such as, but not limited to, polyolefins, polyesters, polyamides, polyurethanes, copolymers and mixtures thereof.

A second layer of spunbond fibers is made by spunbond apparatus 32 in a manner similar to that described for spunbond apparatus 12; i.e., a spinneret 34 produces filaments which are quenched and crimped by a quench blower 36 and attenuated by an aspirator 38. The fibers deposited on the meltblown layer are then compressed by a second compaction device 40 to form a three layer laminate comprised of spunbond-meltblown-spunbond fibers 42 (the "SMS" laminate).

Spunbond nonwoven fabrics are generally bonded in some manner as they are produced in order to give them sufficient structural integrity to withstand the rigors of further processing into a finished product. Bonding can be accomplished in a number of ways such as hydroentanglement, needling, ultrasonic bonding, adhesive bonding, stitchbonding, through-air bonding and thermal bonding. A preferred method is by thermal bonding. The SMS laminate 42 is moved off the belt 24 and passed between a nipped pair of thermal bond rolls 44 and 46. Bond roll 44 is a conventional smooth anvil roll. Bond roll 46 is a conventional pattern roll having a plurality of pins 48. The pins create bond points within the fabric matrix. The number and size of bond points are related to fabric stiffness; i.e., higher bond areas or more bond points per unit area produce a stiffer fabric. The SMS laminate is passed between the rolls 44 and 46 and the pins 48 imprint a pattern on the SMS laminate 42 by pressing on the anvil roll 44 where the nip pressure is controlled for uniformity.

The rolls 44 and 46 can be heated to more efficiently form fiber bonds. The rolls 44 and 46 may be heated to different temperatures. The optimal temperature range and roll differential depends on the denier, fiber composition, web mass and web density and whether monocomponent or conjugate fibers are used. For monocomponent polypropylene fibers having approximately a 3 dpf, produced at about 500 feet per minute, the temperature range is about 270° F. (132° C.), to about 340° F. (171° C.), with a preferred differential between pattern and anvil roll of about 10° F. (5.5° C.) to about 30° F. (17° C.). For monocomponent polypropylene fibers having approximately a 1 dpf at the same production speed, the temperature range is about 240° F. (115° C.) to about 290° F. (143° C.), with a preferred differential of about 40°–50° F. (22°–28° C.). The overall temperature range is lower for smaller denier fibers because heat transfer is more efficient. For a given raw material, the temperature range stays generally the same, but shifts warmer or cooler, depending on conveyor speed which significantly impacts web mass and density. Preferably, the pattern roll is heated to a higher temperature than the anvil. The lower temperature on the anvil roll 44 reduces the possibility of fiber glazing and secondary fiber-to-fiber bonding between the bond points. The result of this differential bond roll temperature is that secondary fiber-to-fiber bonds are reduced without affecting the integrity of the primary bonds, therefore improving fabric drape.

After the laminate 42 passes through the bond rolls 44 and 46, it is passed to a neck stretching assembly 50, comprising a pair of nipped rolls 52 and 54. The rolls 52 and 54 run under tension at a controlled speed faster than the speed of the bond rolls 44 and 46, thus stretching the SMS laminate 42 in the same direction as the path of the fabric, known as the "machine direction." Neck stretching breaks fiber-to-fiber bonds and strains fibers between bond points, thereby reducing fabric stiffness. The rolls may be heated or cooled as needed to achieve desired mat properties and dimensional stability.

The neck stretched SMS laminate 42 is then passed to an unnecking assembly 56 and a collection roll 66 as known to those skilled in the art such as has been generally set forth in U.S. Pat. No. 5,810,954 to Jacobs et al.

Figure 2:
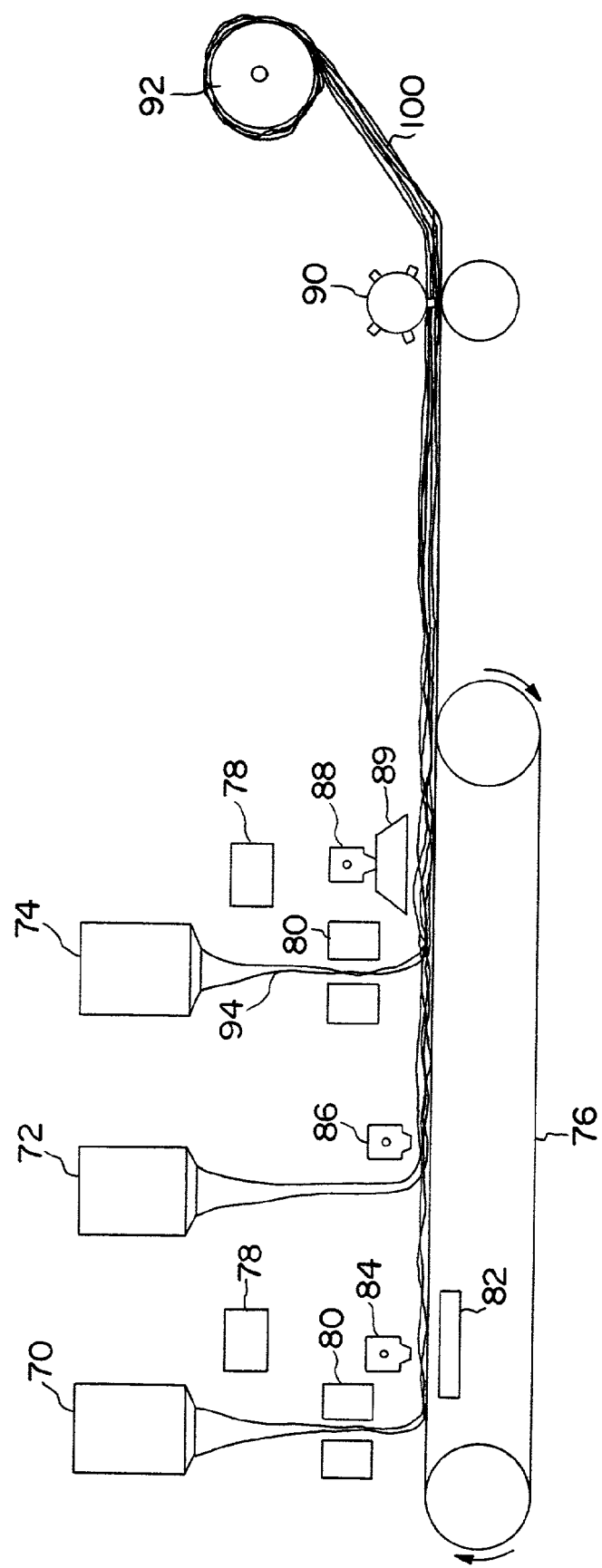
FIG. 2 is a schematic view illustrating apparatus and process according to the present invention.

Referencing FIG. 2, an apparatus according to the present invention may include a first spunbond fiber making apparatus, or station 70, intermediate thermoplastic fiber making apparatus, or station, 72, and second spunbond fiber making apparatus, or station 74, all positioned in-line over a foraminous moving fiber collection belt 76. Details of the fiber making assemblies will be similar to those of FIG. 1 or otherwise as known in the art, including quench blowers, collectively 78, aspirator channels, collectively 80, and vacuum apparatus 82. Additional materials such as films or preformed nonwoven webs or the like may also be used within the context of the present invention. Unlike the known art of FIG. 1, in the present invention, each fiber making assembly 70, 72, and 74 may have additional in-line fiber processing means stationed after it and near the belt 76, as further explained below.

In the illustrated embodiment the additional fiber processing means are heat treatment means including as first hot air knife 84 behind the first fiber station 70, a second hot air knife 86 behind the intermediate fiber station 72 and a diffuse hot air knife 88 behind the second fiber station 74. Laminating apparatus, shown as a thermal point bond roller 90, and a collection roller 92 are also included in the exemplary embodiment of FIG. 2.

The first fiber station 70 in the illustrated embodiment is desirably constructed and arranged to provide a spunbond fiber web of thermoplastic filaments adaptable to be fused by the first hot air knife (HAK) 84 in standard operation to create a web integrally or autogenously fused to a degree of mechanical strength sufficient to allow the web to remain structurally integral during whatever speeds or manipulations are used to transfer the web during processing; for example, standard belt speeds of 950 fpm and transfer of the web from one belt to another belt or the collection roller 92. The HAK is used to provide quick fusing before the spunbond web reaches next fiber deposit station.

Figure 3:
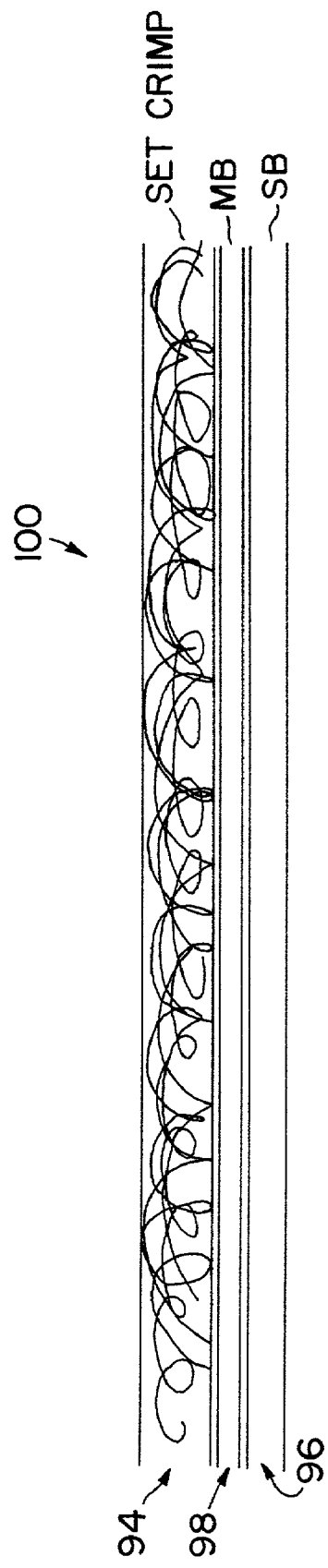
FIG. 3 is a schematic side view of a laminate according to one embodiment of the present invention.

The second fiber station 74 is shown as located downstream in the direction of belt travel from the first fiber station 70. The second fiber station 74 is constructed and arranged in the exemplary embodiment to provide a nonwoven web of spunbond homofilament helical crimped filaments to provide a lofty web structure. As discussed above, the helical crimped web structure lacks structural integrity at standard belt speeds and for standard processing operations. The crimped fibers 94 are deposited at the moving belt 76 on top of the spunbond structural web 96 (FIG. 3) as processed from the first fiber station 70, and any intermediate layers 98 from the intermediate fiber station 72, or stations, interposed between the first fiber station 70 and the second fiber station 74. It will be appreciated by the artisan that if the intermediate layer consists of a material, like meltblown fibers or films, which should not, or need not, be heat treated, such as with the hot air knife, the heat treatment step of any such particular layer will be left out. Further, it will be appreciated that the final diffuse heat treatment of the high loft crimped filaments should be conducted so as to not damage the integrity of any underlying layers. Suitable fiber morphology and polymer types for the crimped fibers include single polymer polypropylene helical crimped fibers. Because homofilament helical crimped fibers tend to relax if heated vigorously, and because of the crimped fiber web's lack of structural integrity, the crimped fibers 94 are heat set by the diffuse air knife 88 at a temperature, air flow rate, and traversal rate sufficient to heat set the crimped structure without substantial melt bonding or relaxation of the crimps.

The diffuse HAK 88 is readily achieved by attaching a diffuser mechanism 89 which can end in a plate with multiple perforations for escape of the hot air, rather than as a concentrated line in the HAK. The diffuser 89 may also extend the hot air flow over an increased length of web travel for increased dwell time of the crimped fiber within the diffused hot air. It will of course be appreciated that the diffuse air flow according to the present invention need not be created by placing a diffuser over a pre-existing HAK, but may be accomplished in any necessary or desired fashion. Dwell time, air temperature, and flow rates are adjusted according to polymer type and fiber morphology of the crimped fibers. By way of example and not limitation, a homofilament polypropylene helical spunbond layer has been treated with desired results by diffuse air flow wherein the flow rate is about 900 feet per minute over an eighteen inch length in the machine direction at between 200 and 1200 feet per minute traversal rates. Further satisfactory results were obtained on a variety of thermoplastic filaments with a diffuser plenum extending eight inches in the machine direction, at air temperatures of between 270–290° F., at an air flow rate of between 700 and 850 fpm, supplied at a distance of one inch from the forming wire, and material traversal rates of between 300 fpm and 800 fpm.

The laminate layers 94, 96, 98 (FIG. 3) are then thermal point bonded at roller 90 in a manner sufficient to provide integrity to the laminate 100 during later processing without undue compromise of the lofty crimped layer. Although shown in FIG. 2 as being collected for later processing by being wound onto the collection roller 92, it will be appreciated that the laminate 100 may be directly transferred to other apparatus for additional manufacturing steps.

Having thus described a high loft layer laminate with dimensional stability suitable for use with modem web transfer machinery, it will be appreciated that while this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method of making a lofty nonwoven fabric laminate in a single, in-line process, comprising steps in the order of:
    a) depositing a first layer of filaments onto a wire;
    b) bonding the first layer to an integrity sufficient to withstand high speed web transfer;
    c) depositing a second layer of crimped homofilament fibers connected to the first layer while the first layer remains on the wire;
    d) traversing the second layer of crimped homofilament fibers through a flow of heated air at a temperature, flow rate, and traversal rate sufficient to set the crimps of the fibers without substantial melt bonding or relaxation of the fibers and to provide an integrity sufficient to withstand high speed web transfer; and
    e) bonding the heat set second layer and the first nonwoven layer in a manner having sufficient integrity to withstand high speed web transfer.

2. The method of making a lofty nonwoven fabric laminate in a single, in-line process according to claim 1, wherein the second layer of fibers is uncompacted.

3. The method of making a lofty nonwoven fabric laminate in a single, in-line process according to claim 1, wherein the first layer filaments comprise spunbond fibers.

4. The method of making a lofty nonwoven fabric laminate in a single, in-line process according to claim 1, where the first layer fibers are comprised of polypropylene polymer.

5. The method of making a lofty nonwoven fabric laminate in a single, in-line process according to claim 1, wherein the first layer is bonded with a hot air knife.

6. The method of making a lofty nonwoven fabric laminate in a single, in-line process according to claim 1, wherein the second layer crimped fibers comprise helically crimped fibers.

7. The method of making a lofty nonwoven fabric laminate in a single, in-line process according to claim 1, where the second layer fibers comprise polypropylene polymer.

8. The method of making a lofty nonwoven fabric laminate in a single, in-line process according to claim 1, wherein the flow of heated air to the second layer is provided by a diffuse hot air knife.

9. The method of making a lofty nonwoven fabric laminate in a single, in-line process according to claim 1, wherein the temperature is about 260° F. to about 310° F.

10. The method of making a lofty nonwoven fabric laminate in a single, in-line process according to claim 1, wherein the flow rate is between about 700 feet per minute to about 850 feet per minute.

11. The method of making a lofty nonwoven fabric laminate in a single, in-line process according to claim 1, wherein the traversal rate is between about 300 feet per minute to about 800 feet per minute.

12. The method of making a lofty nonwoven fabric laminate in a single, in-line process according to claim 1, wherein the second layer and first layer are bonded by a thermal point bond process.

* * * * *